(12) United States Patent
Mack

(10) Patent No.: US 10,998,773 B2
(45) Date of Patent: May 4, 2021

(54) METHOD FOR INDUCTIVE ENERGY TRANSMISSION

(71) Applicant: Robert Bosch GmbH, Stuttgart (DE)

(72) Inventor: Juergen Mack, Goeppingen (DE)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 16/082,801

(22) PCT Filed: Mar. 1, 2017

(86) PCT No.: PCT/EP2017/054775
§ 371 (c)(1),
(2) Date: Sep. 6, 2018

(87) PCT Pub. No.: WO2017/153224
PCT Pub. Date: Sep. 14, 2017

(65) Prior Publication Data
US 2019/0089208 A1   Mar. 21, 2019

(30) Foreign Application Priority Data
Mar. 10, 2016 (DE) .......................... 102016203937.7

(51) Int. Cl.
| H02J 50/80 | (2016.01) |
| H02J 7/02 | (2016.01) |
| H02J 50/12 | (2016.01) |
| H04N 5/00 | (2011.01) |
| H04B 5/00 | (2006.01) |
| H02J 50/10 | (2016.01) |

(52) U.S. Cl.
CPC .............. *H02J 50/80* (2016.02); *H02J 7/025* (2013.01); *H02J 50/10* (2016.02); *H02J 50/12* (2016.02); *H04B 5/0031* (2013.01); *H04B 5/0037* (2013.01); *H04B 5/0075* (2013.01)

(58) Field of Classification Search
USPC ....................................................... 320/108
See application file for complete search history.

(56) References Cited

U.S. PATENT DOCUMENTS

| 10,110,075 | B2 * | 10/2018 | Podkamien | H02J 5/00 |
| 2009/0096413 | A1 * | 4/2009 | Partovi | H01F 5/003 320/108 |
| 2010/0308661 | A1 * | 12/2010 | Garcia | H02J 1/102 307/80 |
| 2010/0315045 | A1 * | 12/2010 | Zeine | H02J 50/90 320/137 |
| 2011/0062793 | A1 * | 3/2011 | Azancot | H02J 50/12 307/116 |

(Continued)

FOREIGN PATENT DOCUMENTS

| EP | 2953271 A1 | 12/2015 |
| JP | 2007537688 A | 12/2007 |

(Continued)

OTHER PUBLICATIONS

International Search Report for PCT/EP2017/054775, dated May 16, 2017.

*Primary Examiner* — Richard Isla
*Assistant Examiner* — Dung V Bui
(74) *Attorney, Agent, or Firm* — Norton Rose Fulbright US LLP; Gerard Messina

(57) ABSTRACT

A method is described for an inductive transmission of energy, in particular for charging an energy storage device, in which an induction unit transmits at least one synchronizing signal. It is provided that, in a synchronizing step, at least one signal characteristic of the synchronizing signal is set.

14 Claims, 3 Drawing Sheets

(56) References Cited

U.S. PATENT DOCUMENTS

| | | | | |
|---|---|---|---|---|
| 2012/0161535 A1* | 6/2012 | Jung | ............... | H02J 50/40 |
| | | | | 307/104 |
| 2012/0202435 A1* | 8/2012 | Kim | ............... | H02J 7/00034 |
| | | | | 455/69 |
| 2013/0024046 A1* | 1/2013 | Toriya | ............... | H02J 5/005 |
| | | | | 700/297 |
| 2013/0179061 A1* | 7/2013 | Gadh | ............... | B60L 53/30 |
| | | | | 701/123 |
| 2013/0193773 A1* | 8/2013 | Van Wageningen | ............... | |
| | | | | H04B 5/0031 |
| | | | | 307/104 |
| 2014/0125146 A1* | 5/2014 | Azancot | ............... | H01F 38/14 |
| | | | | 307/104 |
| 2014/0125147 A1* | 5/2014 | Azancot | ............... | H02J 7/025 |
| | | | | 307/104 |
| 2014/0335490 A1* | 11/2014 | Baarman | ............... | A61B 5/002 |
| | | | | 434/236 |
| 2014/0347008 A1* | 11/2014 | Chae | ............... | H02J 7/025 |
| | | | | 320/108 |
| 2015/0054355 A1* | 2/2015 | Ben-Shalom | ............... | H04B 5/0037 |
| | | | | 307/104 |
| 2015/0372493 A1* | 12/2015 | Sankar | ............... | H02J 50/10 |
| | | | | 307/104 |

FOREIGN PATENT DOCUMENTS

| | | |
|---|---|---|
| JP | 2012060721 A | 3/2012 |
| JP | 2012135127 A | 7/2012 |
| JP | 2015517794 A | 6/2015 |
| WO | 2015197443 A1 | 12/2015 |

\* cited by examiner

METHOD FOR INDUCTIVE ENERGY TRANSMISSION

FIELD OF THE INVENTION

A method is known for inductive energy transmission, in particular for charging an energy storage device, in which an induction unit transmits at least one synchronization signal.

SUMMARY

The present invention is based on a method for an inductive energy transmission, in particular for charging an energy storage device, in which an induction unit transmits at least one synchronization signal.

It is proposed that, in at least one synchronizing step, at least one signal characteristic of the synchronizing signal be set.

Preferably, the method is provided for a charging of at least one energy storage device for handheld power tools, in particular a plurality of energy storage devices for handheld power tools. "Provided" is to be understood as meaning in particular specifically programmed, designed, and/or equipped. The statement that an object is provided for a particular function is to be understood in particular as meaning that the object fulfills and/or performs this particular function in at least one state of use and/or state of operation. In the present context, a "handheld power tool" is to be understood in particular as a tool that processes workpieces, but advantageously a drill, a drill hammer and/or impact hammer, a saw, a planer, a screwdriver, a mill, a grinder, an angle grinder, a garden tool, and/or a multi-function tool. Preferably, the energy storage devices to be charged have at least one battery pack. Preferably, the energy storage devices have a nominal voltage of less than 50 V, preferably less than 40 V, particularly preferably less than 20 V. Preferably, the energy storage devices to be charged have a storage capacity of less than 10.0 Ah, preferably less than 5.0 Ah, particularly preferably less than 4.0 Ah. In the present context, an "induction unit" is to be understood in particular as an electronic transmitting device that is provided in particular to transform an of electrical energy provided in particular by an energy source, in particular an energy supply network, and to transmit it inductively, and/or an electronic receive unit that is provided in particular to accept and/or at least temporarily store an inductively transmitted electrical energy. In particular, the induction unit has at least one oscillating circuit that includes at least one coil that is provided in particular for the purpose of producing a magnetic alternating field, and includes at least one resonance capacitor.

In the present context, a "synchronizing signal" is to be understood in particular as an electrical, digital, or analog signal, in particular at least one voltage signal and/or current signal. In particular, the synchronization signal is provided to wake up a receive unit from a sleep and/or power-saving mode before or at the beginning of an inductive energy transmission, to put the receive unit into a receive state, and/or to synchronize a receive unit with a transmit unit. Preferably, the synchronization signal is provided to wake up the receive unit from a sleep and/or power-saving mode after an interruption of an inductive energy transmission, in particular an interruption for the purpose of foreign object recognition, to put it into a receive state, and/or to synchronize the receive unit with a transmit unit. Preferably, the synchronizing signal is realized in the form of a pulse, in particular having a pulse duration between 1 ms and 20 ms. Preferably, the synchronizing signal has a power curve that is realized at least essentially as a rectangular pulse. In particular, the power curve of the synchronizing signal deviates from a rectangular pulse by less than 20%, preferably less than 10%, particularly preferably less than 5%. In this context, a "signal characteristic" is to be understood in particular as a characteristic of the synchronizing signal that is formed in particular by a signal power level, a signal voltage, a signal current, a signal duration, and/or a signal frequency. In particular, the signal characteristic of the synchronizing signal is determined as a function of at least one operating parameter of the induction unit, for example a network input voltage, a voltage class of an energy storage device to be charged, a distance between a transmit unit and a receive unit, and/or an orientation between a transmit unit and a receive unit. In particular, the induction unit has a control and/or regulating unit that is provided for setting the signal characteristic of the synchronizing signal. A "control and/or regulating unit" is to be understood in particular as a unit having at least one control electronics unit. A "control electronics unit" is to be understood in particular as a unit having a processor unit and having a storage unit, and having an operating program stored in storage unit.

Through such a design, a method of the type indicated can be provided for an inductive energy transmission having advantageous properties with regard to a synchronization of an induction unit, in particular a synchronization between a transmit unit and a receive unit, in particular at the beginning of an energy transmission. In particular, a secure and/or reliable synchronization can be achieved by setting a signal characteristic of a synchronizing signal even when there are changing operating parameters.

In addition, it is proposed that, in at least one method step for transmitting the at least one synchronizing signal, the induction unit be connected to a constant voltage source that is made at least essentially independent of a load operating voltage source. A "load operating voltage source" is to be understood in particular as a voltage source that is provided to supply the induction unit with electrical energy during an inductive energy transmission. In particular, the load operating voltage source is an energy supply network. In the present context, a "constant voltage source" is to be understood in particular as a voltage source that supplies a voltage that is at least essentially constant over time. In particular, the induction unit is separated from the load operating voltage source before or during the method step for transmitting the at least one synchronizing signal, in particular before a connection to the constant voltage source. In this way, advantageously a voltage that remains approximately constant can be provided for transmitting the synchronizing signal, in particular even when there is a fluctuating output voltage of the load operating voltage source.

In addition, it is proposed that in at least one further synchronizing step at least one further synchronizing signal is produced that at least essentially produces a maximum voltage in a receive unit that is equal to that produced by the synchronizing signal. In particular, a maximum voltage of the further synchronizing signal differs from a maximum voltage of the synchronizing signal by a maximum of 10%, preferably a maximum of 5%, particularly preferably a maximum of 2%. In this way, an advantageously reliable, in particular cyclical, synchronization can be achieved.

In addition, it is proposed that, in at least one method step, a transmit frequency of the synchronization signal is set. Preferably, the transmit frequency is set to a value that is smaller than or greater than the value of a resonant frequency. In particular, an exciting frequency of the synchronization signal is set. In particular, the transmit frequency is set as a function of at least one operating parameter of the induction unit. Through the setting of the transmit frequency of the synchronization signal, an advantageously simple adaptation of the synchronizing signal can be enabled.

In addition, it is proposed that the transmit frequency be set as a function of a voltage of a load operating voltage source of the induction unit. In particular, for the setting of the transmit frequency an output voltage of the load operating voltage source is continuously measured during a transmission of the synchronizing signal. In particular, the transmit frequency is set in such a way that as the voltage of the load operating voltage source decrease, the transmit frequency is shifted in the direction of a resonant frequency. When there is an increasing voltage of the load operating voltage source, the transmit frequency is in particular set in such a way that the transmit frequency is shifted away from a resonant frequency. By setting the transmit frequency as a function of the voltage of the load operating voltage source, it can be achieved that a voltage that remains at least essentially constant results at a receiver, even when there is a fluctuating voltage of the load operating voltage source.

In addition, it is proposed that, in at least one method step, the transmit frequency is iteratively modified as a function of a reaction of a receive unit. Preferably, the respective transmit frequency is iteratively made to approach a resonant frequency. In particular, starting from a start value that corresponds to a low resonance voltage value at the receiver, the transmit frequency is made to approach the resonant frequency step by step until a response signal is received from a receive unit. Alternatively, the respective transmit frequency can be set to a resonant frequency and can then iteratively be moved away from the resonant frequency. In particular, starting from a start value that corresponds at least essentially to the resonant frequency, the transmit frequency can be shifted step-by-step away from the resonance for as long as a response is still received from a receive unit. In this way, an advantageously secure synchronization can be achieved between a transmit unit and a receive unit.

In addition, it is proposed that the transmit duration of the synchronizing signal be set. Preferably, the transmit duration is set as a function of a voltage of a load operating voltage source of the induction unit. In this way, an advantageously secure synchronization can take place in particular when there is a fluctuating voltage of a load operating voltage source.

In addition, it is proposed that the signal characteristic be set as a function of a type of a receive unit. In particular, an induction unit can recognize a type of the receive unit, in particular automatically via a coding. Alternatively or in addition, a type of the receive unit can be set immediately at the induction unit by an operator. In this way, an advantageous setting of the signal characteristic can be enabled at the receive unit with different operating parameters.

In addition, an inductive charging device having an induction unit is proposed for carrying out the method according to the present invention. Preferably, the inductive charging device is provided for charging at least one energy storage device for handheld power tools, in particular a plurality of energy storage devices for handheld power tools. Preferably, the inductive charging device has at least one receive unit that is provided to receive the synchronizing signal. Through such a design, an inductive charging device can be provided having advantageous properties with regard to a synchronization with a receive unit.

In addition, it is proposed that the inductive charging device have a changeover unit that is provided to connect the induction unit alternatively to a load operating voltage source or to a constant voltage source. The constant voltage source is in particular at least essentially independent of the load operating voltage source. In particular, the changeover unit is provided to connect the induction unit to the constant voltage source during a transmission of a synchronizing signal. In addition, the changeover unit is in particular provided to separate the induction unit from the load operating voltage source before and/or during a transmission of a synchronizing signal. In this way, a voltage that remains approximately constant can advantageously be provided for the transmission of the synchronizing signal, in particular even when there is a fluctuating output voltage of the load operating voltage source.

The method according to the present invention is not intended to be limited to the above-described use and specific embodiment. In particular, in order to realize a mode of functioning described herein, the method according to the present invention can have a number of individual elements, components, and units differing from a number named herein.

DETAILED DESCRIPTION

Figure 1:
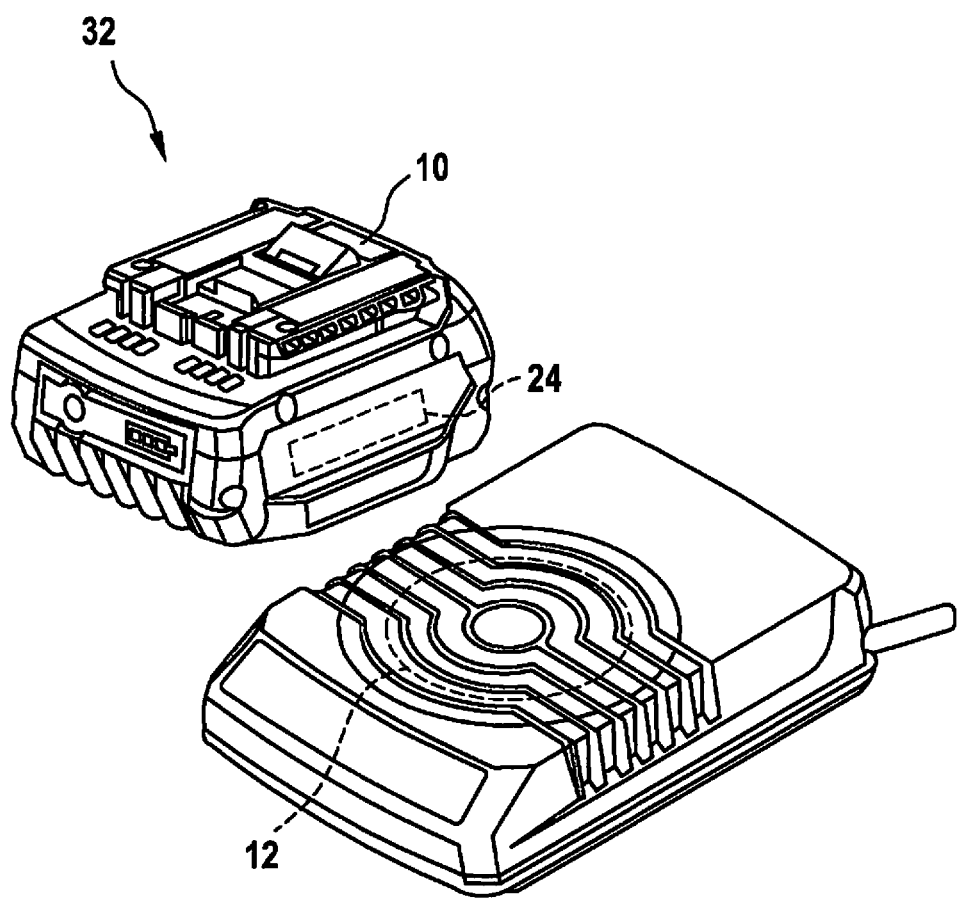
FIG. 1 shows a perspective view of an inductive charging device having an induction unit and a receive unit.

FIG. 1 shows a perspective view of an inductive charging device 32 having an induction unit 12 and a receive unit 24. Receive unit 24 is integrated into an energy storage unit 10. Inductive charging device 32 is provided for an inductive charging of energy storage unit 10. Energy storage unit 10 is fashioned as a handheld power tool battery. Inductive unit 12 is provided to transmit electrical energy to receive unit 24 during a charge process. For this purpose, energy storage unit 10 is placed onto induction unit 12 of inductive charging device 32.

Figure 2:
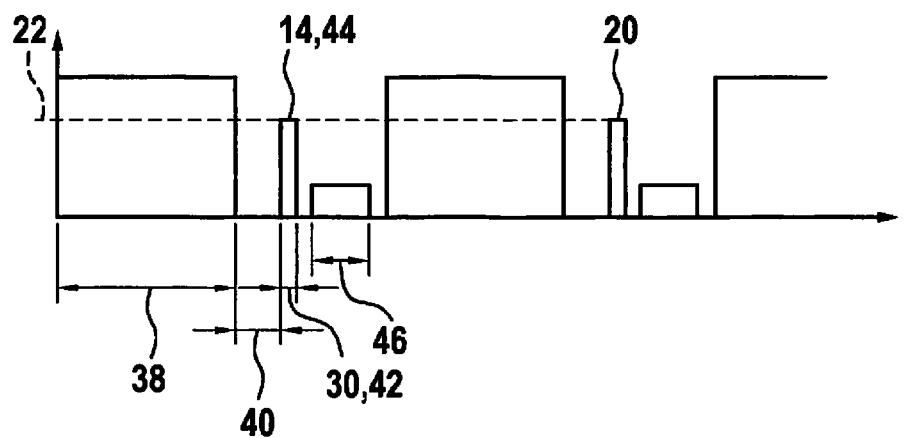
FIG. 2 shows a temporal curve of a charging process.

During a charging of energy storage unit 10, a transmission of energy between induction unit 12 and receive unit 24 is cyclically interrupted. In particular, the transmission of energy between induction unit 12 and receive unit 24 is cyclically interrupted in order to carry out a foreign object recognition. An interruption of the transmission of energy during a charge process is necessary because it cannot be excluded that during an energy transmission between induction unit 12 and receive unit 24, foreign objects, in particular foreign objects that may heat up due to the magnetic alternating field present during the charge process, move between induction unit 12 and receive unit 24. FIG. 2 shows a temporal curve of a charge process. In a first phase 38 of the charge process, an energy transmission takes place between induction unit 12 and receive unit 24. In a second phase 40, the energy transmission is interrupted in order to carry out the foreign object recognition. In a third phase 42, a synchronizing signal 14 is sent to receive unit 24 from induction unit 12. Synchronizing signals 14, 20 are realized in the form of a pulse 44. Pulse 44 has in particular a pulse duration between 1 ms and 20 ms. Synchronizing signal 14 has a power curve and/or voltage curve that is realized at least essentially as a rectangular pulse. Synchronizing signal 14 is provided to wake up receive unit 24 from a sleep and/or power-saving mode after the interruption of the energy transmission for the purpose of a foreign object recognition, to put it into a receive state, and/or to synchronize receive unit 24 with induction unit 12. Synchronizing signal 14 is followed by a communication phase 46. Communication phase 46 is used for example to determine a transmit power level between induction unit 12 and receive unit 24. Following communication phase 46, the transmission of energy between induction unit 12 and receive unit 24 is resumed. The described sequence is cyclically repeated during a charge process. Further synchronizing signals 20 produced by induction unit 12 produce a maximum voltage 22 in receive unit 24 that is at least essentially equal to that produced by the first produced synchronizing signal 14.

Figure 3:
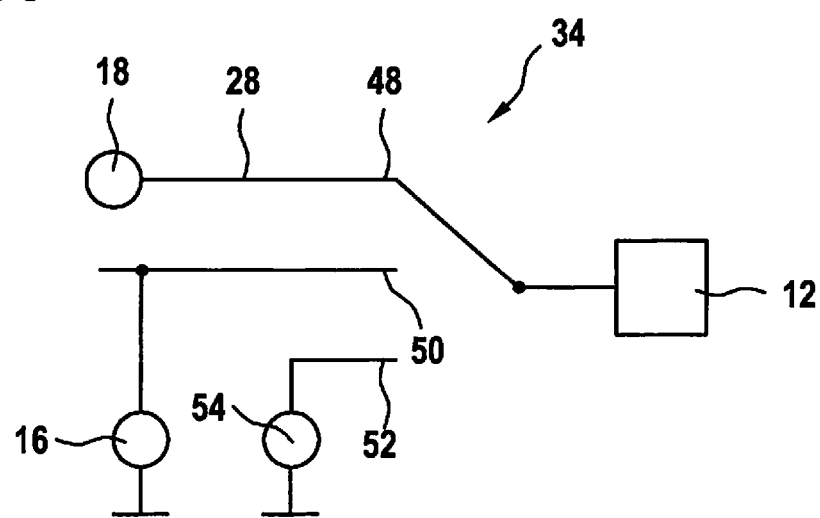
FIG. 3 shows a schematic representation of the changeover unit for changing over between a load operating voltage source and a constant voltage source.

In a synchronizing step, at least one signal characteristic of synchronizing signal 14 is set. In particular, a signal characteristic of synchronizing signal 14 is set in particular in order to achieve a constant voltage in receive unit 24 even when there are fluctuating network voltages and/or other disturbing influences during a transmission of synchronizing signals 14, 20. A constant voltage in receive unit 24 during a transmission of synchronizing signals 14, 20 is necessary in order to ensure a secure waking up and/or synchronizing of receive unit 24. In order to achieve a constant voltage in receive unit 24 during a transmission of synchronizing signals 14, 20, induction unit 12 is connected to a constant voltage source 16 in a method step for transmitting synchronizing signals 14, 20. Constant voltage source 16 is preferably a stabilized voltage source. Constant voltage source 16 is made essentially independent of a load operating voltage source 18 to which induction unit 12 is connected during a transmission of energy. Inductive charge device 32 has a changeover unit 34 that is provided to connect induction unit 12 alternatively to load operating voltage source 18 or to constant voltage source 16. FIG. 3 shows a schematic representation of changeover unit 34. Changeover unit 34 has three switching positions 48, 50, 52. In first switching position 48, the impulse unit is connected to load operating voltage source 18, which is provided to provide a voltage 28 for the transmission of energy between induction unit 12 and receive unit 24. In second switching position 50, induction unit 12 is connected to constant voltage source 16, which is provided to provide a voltage for transmitting synchronizing signals 14, 20. In third switching position 52, induction unit 12 is connected to a further constant voltage source 54, which is provided to provide a voltage for communication phase 46.

Figure 4:
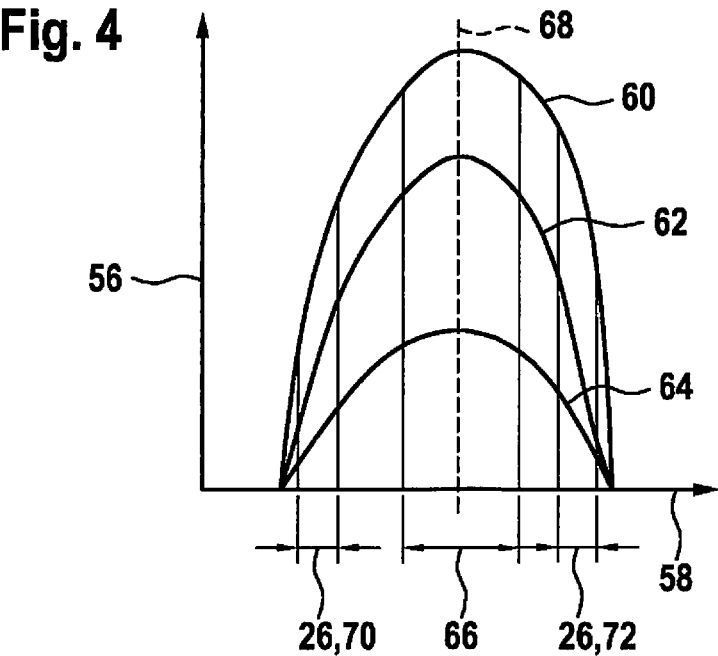
FIG. 4 shows, in a diagram, the resonant voltage over the frequency for a plurality of exciting voltages.
Figure 5:
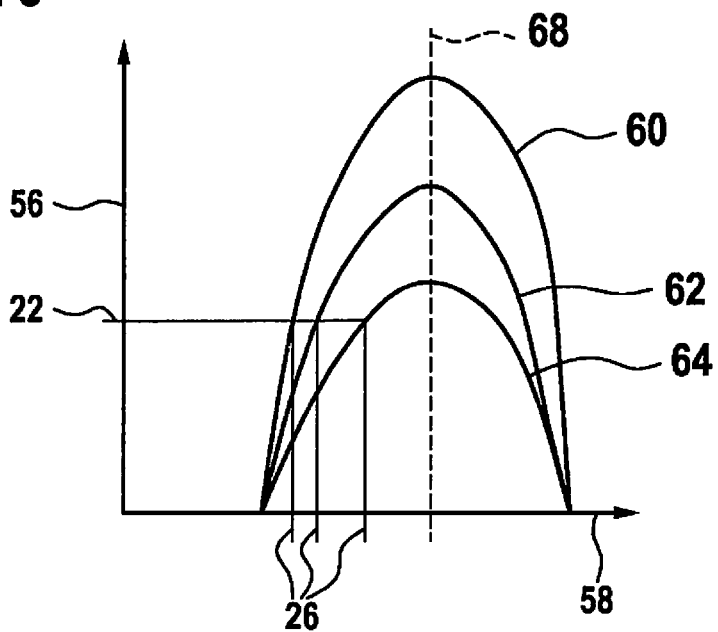
FIG. 5 shows, in a diagram, a necessary modification of the frequency of the exciting voltage in order to obtain a resonant voltage that remains constant when there are different voltage values of the exciting voltage.

Alternatively or in addition to a changeover between load operating voltage source 18 and constant voltage source 16, in at least one method step a transmit frequency 26 of synchronizing signal 14, 20 can be set. Transmit frequency 26 can be set as a function of a voltage 28 of load operating voltage source 18 of induction unit 12. FIG. 4 shows, in a diagram, resonance voltage 56 over frequency 58 for a plurality of exciting voltages 60, 62, 64. A transmission of energy between induction unit 12 and receive unit 24 standardly takes place in a frequency range 66 that is close to resonant frequency 68. In principle, here a resonance voltage 56 will form that is close to a maximum resonance voltage. In order not to impress too high a voltage and/or power level on receive unit 24 during a transmission of a synchronizing signal 14, 20, induction unit 12, in particular an oscillating circuit of induction unit 12, is excited, during a transmission of a synchronizing signal 14, 20, with a transmit frequency 26 that is in a frequency range 70, 72 at a distance from resonant frequency 68. FIG. 5 shows, for a fixedly specified voltage value 74 of synchronizing signals 14, 20, how transmit frequency 26 of exciting voltage 60, 62, 64 has to be modified in order to compensate a variation of a maximum voltage 22 of synchronizing signals 14, 20 for a specified exciting voltage 60, 62, 64. Alternatively, transmit frequency 26 can be iteratively modified as a function of a reaction of receive unit 24. Preferably, transmit frequency 26 is made to iteratively approach a resonant frequency 68. In particular, starting from a start value that corresponds to a low resonance voltage value at the receiver, transmit frequency 26 is made to approach resonant frequency 68 step by step until a response signal is received from a receive unit 24. Alternatively, the respective transmit frequency 26 can be set to a resonant frequency 68, and then iteratively moved away from resonant frequency 68. In particular, starting from a start value that corresponds at least essentially to resonant frequency 68, transmit frequency 26 can be shifted away from the resonance step by step as long as a response is still received from a receive unit 24.

Alternatively or in addition to the above, in at least one method step a transmit duration 30 of synchronizing signals 14, 20 can be set. Transmit duration 30 is set as a function of a voltage 28 of a load operating voltage source 18 of induction unit 12. In addition, it is alternatively or additionally conceivable that the signal characteristic be set as a function of the type of a receive unit 24. In particular, induction unit 12 can recognize a type of receive unit 24, in particular automatically via a coding. Alternatively or in addition, a type of receive unit 24 can be set immediately at induction unit 12 by an operator.

What is claimed is:

1. A method for an inductive energy transmission, comprising:
    activating an induction unit to transmit at least one synchronizing signal; and
    performing at least one synchronizing step in which at least one signal characteristic of the synchronizing signal is set,
    wherein a changeover unit is provided to connect the induction unit alternatively to a load operating voltage source or to a constant voltage source in order to separate the induction unit from the load operating voltage source before and/or during a transmission of the synchronizing signal.

2. The method as recited in claim 1, wherein the method is for charging an energy storage device.

3. The method as recited in claim 1, further comprising:
    transmitting the at least one synchronizing signal, wherein in the transmitting step the induction unit is connected to the constant voltage source that is at least essentially independent of the load operating voltage source.

4. The method as recited in claim 1, further comprising:
    performing at least one further synchronizing step in which at least one further synchronizing signal is produced that at least essentially produces a maximum voltage in a receive unit that is equal to that produced by the synchronizing signal.

5. The method as recited in claim 1, further comprising setting a transmit frequency of the synchronizing signal.

6. The method as recited in claim 5, wherein the transmit frequency is set as a function of a voltage of the load operating voltage source of the induction unit.

7. The method as recited in claim 5, further comprising iteratively modifying the transmit frequency as a function of a reaction of a receive unit.

8. The method as recited in claim 1, further comprising setting a transmit duration of the synchronizing signal.

9. The method as recited in claim 8, wherein the transmit duration is set as a function of a voltage of the load operating voltage source of the induction unit.

10. The method as recited in claim 1, wherein the signal characteristic is set as a function of a type of a receive unit.

11. The method as recited in claim 1, wherein the changeover unit has at least three switching positions, a first switching position in which an impulse unit is connected to the load operating voltage source, a second switching position in which induction unit is connected to the constant voltage source, and a third switching position in which induction unit is connected to a further constant voltage source.

12. An induction unit for an inductive energy transmission, comprising:
   an activator configured for activating an induction unit to transmit at least one synchronizing signal; and
   a performing arrangement configured for performing at least one synchronizing step in which at least one signal characteristic of the synchronizing signal is set; and
   a changeover unit provided to connect the induction unit alternatively to a load operating voltage source or to a constant voltage source in order to separate the induction unit from the load operating voltage source before and/or during a transmission of the synchronizing signal.

13. An inductive charging device, comprising:
   at least one induction unit for an inductive energy transmission, the induction unit including:
      an activator configured for activating an induction unit to transmit at least one synchronizing signal, and
      a performing arrangement configured for performing at least one synchronizing step in which at least one signal characteristic of the synchronizing signal is set; and
   a changeover unit is provided to connect the induction unit alternatively to a load operating voltage source or to a constant voltage source in order to separate the induction unit from the load operating voltage source before and/or during a transmission of the synchronizing signal.

14. The inductive charging device as recited in claim 13, further comprising:
   at least one receive unit for receiving the synchronizing signal.

* * * * *